US008961919B2

(12) United States Patent
Joung et al.

(10) Patent No.: US 8,961,919 B2
(45) Date of Patent: Feb. 24, 2015

(54) METHOD OF PREPARING SILICA AEROGEL POWDER

(75) Inventors: Young Chul Joung, Suwon-si (KR); Myung Je Roe, Seoul (KR); Young Jong Yoo, Hwaseong-si (KR); Jong Chul Park, Hwaseong-si (KR); Hee Jung Choi, Seongnam-si (KR); Min Woo Kim, Daejeon (KR)

(73) Assignee: Jios Aerogel Limited, Hong Kong (HK)

( * ) Notice: Subject to any disclaimer, the term of this patent is extended or adjusted under 35 U.S.C. 154(b) by 890 days.

(21) Appl. No.: 13/099,936

(22) Filed: May 3, 2011

(65) Prior Publication Data

US 2012/0225003 A1    Sep. 6, 2012

(30) Foreign Application Priority Data

Mar. 3, 2011   (KR) .......................... 10-2011-0018839

(51) Int. Cl.
*C01B 33/12* (2006.01)
*C01B 33/158* (2006.01)
*C01B 33/16* (2006.01)

(52) U.S. Cl.
CPC ............. *C01B 33/158* (2013.01); *C01B 33/166* (2013.01)
USPC ........................................................ 423/338

(58) Field of Classification Search
CPC .. C01B 33/1585; C01B 33/145; C01B 33/155
USPC ........................................................ 423/338
See application file for complete search history.

(56) References Cited

U.S. PATENT DOCUMENTS

| 6,197,270 | B1 * | 3/2001 | Sonoda et al. ................ 423/338 |
| 7,402,293 | B2 * | 7/2008 | Meyer et al. .................. 423/335 |
| 2008/0081014 | A1 * | 4/2008 | Ahn et al. ...................... 423/338 |
| 2010/0172815 | A1 * | 7/2010 | Park et al. ...................... 423/338 |
| 2010/0233061 | A1 * | 9/2010 | Park et al. ...................... 423/338 |

FOREIGN PATENT DOCUMENTS

WO    WO 2008143384 A1 * 11/2008

OTHER PUBLICATIONS

Bhagat et al., "Textural properties of ambient pressure dried water-glass based silica aerogel beads: One day synthesis," Microporous and Mesoporous Materials 96 (2006) 237-244.*
Li et al., "A Novel Method of Preparation of Superhydrophobic Nanosilica in Aqueous Solution," Chemistry Letters vol. 35, No. 1 (2006) 94-95.*

* cited by examiner

Primary Examiner — Anthony J Zimmer
(74) *Attorney, Agent, or Firm* — Novick, Kim & Lee, PLLC; Jae Youn Kim

(57) ABSTRACT

A method of preparing silica aero-gel powders having a short preparation time and stable preparation processes. In the method, the silica aerogel powders are generated by using a water glass solution, an inorganic acid, an organosilane compound and an organic solvent. The method includes dispersion-solution generating, gelating and solvent exchanging and drying. In the dispersion-solution generating, a dispersion solution is generated by dispersing the water glass solution and the organosilane compound in the organic solvent. In the gelating and solvent exchanging, silica hydrogel is generated by adding the inorganic acid to the dispersion solution and simultaneously performing gelating and solvent-exchanging. In the drying, the silica aerogel powders are generated by drying the silica hydro-gel.

14 Claims, 3 Drawing Sheets

FIG. 2

| 500ml WATER GRASS SiO$_2$ CONCENTRATION (wt.%) | HNO$_3$ (ml) | HMDS (ml) | AMOUNT OF GENERATED AEROGEL (g) | SPECIFIC SURFACE AREA (m$^2$/g) | DENSITY (g/m$^3$) |
|---|---|---|---|---|---|
| 3 | 40 | 60 | 29 | 807 | 0.07 |
| 4 | 40 | 60 | 41 | 820 | 0.07 |
| 5 | 36 | 60 |  | 773 | 0.09 |
| 5 | 38 | 60 |  | 795 | 0.08 |
| 5 | 40 | 60 | 48 | 817 | 0.06 |
| 5 | 42 | 60 | - | - | - |
| 6 | 40 | 60 | 52 | 795 | 0.09 |
| 7 | 40 | 60 | 55 | 750 | 0.12 |
| 8 | 40 | 60 | 60 | 721 | 0.12 |
| 9 | 40 | 60 | 62 | 732 | 0.13 |
| 10 | 40 | 60 | 62 | 717 | 0.15 |

US 8,961,919 B2

METHOD OF PREPARING SILICA AEROGEL POWDER

CROSS-REFERENCE TO RELATED PATENT APPLICATION

This application claims the benefit of Korean Patent Application No. 10-2011-0018839, filed on Mar. 3, 2011, in the Korean Intellectual Property Office, the disclosure of which is incorporated herein in its entirety by reference.

BACKGROUND OF THE INVENTION

1. Field of the Invention

One or more aspects of the present invention relate to methods of preparing silica aerogel powders, and more particularly, to methods of preparing silica aerogel powders having a short preparation time and of preventing heat and explosive reactions from being generated.

2. Description of the Related Art

Silica gel represented by $SiO_2 \cdot nH_2O$ has $SiO_2$ particles in which fine pores are connected to each other to constitute a rigid net structure. Each $SiO_2$ particle is an amorphous particle that has high porosity of 90% or more and a specific surface area of 600 $m^2/g$ or more and is formed by solidifying a solvent such as water between $SiO_2$ particles. Since silica gel has a wide surface area, silica gel has very high absorption with respect to alcohol or water, and thus silica gel may be used as a dehumidifier. Also, silica gel may be used as a heat insulating material, a catalyst carrier, an insulating material or the like. Likewise, even though silica gel is widely used in various fields, silica gel is very restrictively used. This is because there are a number of dangers related to preparation processes, and the preparation processes are complicated, thus increasing preparation costs.

Silica aerogel powders have been prepared by using a supercritical fluid extraction technique or an ambient pressure drying method. When silica aerogel powders are prepared by using a supercritical fluid extraction technique, preparation costs are increased, and there are dangers involved since much heat may be generated due to explosive reactions between materials (e.g., organosilane and inorganic acids). When silica aerogel powders are prepared by using an ambient pressure drying method, although the dangers related to the supercritical fluid extraction technique are removed, preparation costs may be increased by as much as the cost of removing the dangers, and a period of time taken for the preparation processes may be increased compared to the supercritical fluid extraction technique.

SUMMARY OF THE INVENTION

One or more aspects of the present invention provide methods of preparing silica aerogel powders, having a short preparation time and stable preparation processes.

According to an aspect of the present invention, there is provided a method of preparing silica aerogel powders. In the method, the silica aerogel powders are generated by using a water glass solution, an inorganic acid, an organosilane compound and an organic solvent. The method includes dispersion-solution generating, gelating and solvent exchanging and drying. In the dispersion-solution generating, a dispersion solution is generated by dispersing the water glass solution and the organosilane compound in the organic solvent. In gelating and solvent exchanging, silica hydrogel is generated by adding the inorganic acid to the dispersion solution and simultaneously performing gelating and solvent-exchanging. In the drying, the silica aerogel powders are generated by drying the silica hydrogel.

BRIEF DESCRIPTION OF THE DRAWINGS

The above and other features and advantages of the present invention will become more apparent by describing in detail exemplary embodiments thereof with reference to the attached drawings in which:

FIG. 2 is a table showing properties of aerogel powders prepared by using a method according to an embodiment of the present invention;

DETAILED DESCRIPTION OF THE INVENTION

Figure 1:
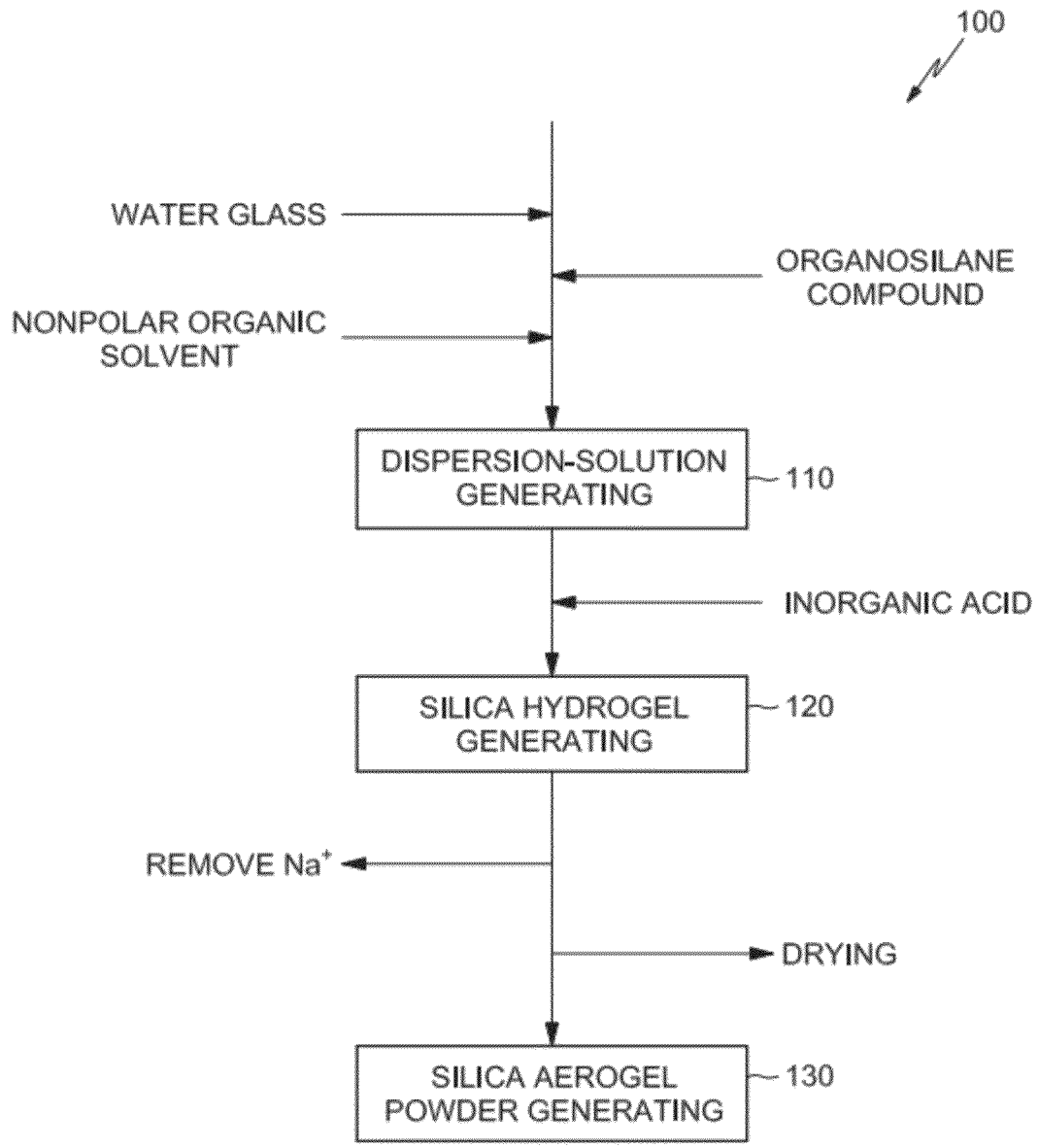
FIG. 1 is a flowchart of a method of preparing silica aerogel powders, according to an embodiment of the present invention.

Hereinafter, the present invention will be described in detail by explaining exemplary embodiments thereof with reference to the attached drawings. Like reference numerals in the drawings denote like elements.

FIG. 1 is a flowchart of a method 100 of preparing silica aerogel powders, according to an embodiment of the present invention.

Referring to FIG. 1, in the silica aerogel powder preparation method 100, silica aerogel is generated by using a water glass solution, an inorganic acid, an organosilane compound and an organic solvent. In addition, the silica aerogel powder preparation method 100 includes dispersion-solution generating 110, gelating and solvent exchanging 120 and drying 130. In the gelating and solvent exchanging 120, silica hydrogel is generated. In the drying 130, silica aerogel powders are generated. In FIG. 1, in order to indicate materials generated in respective operations, silica hydrogel generating 120 and silica aerogel powder generating 130 are shown instead of the gelating and solvent exchanging 120 and the drying 130, respectively. Hereinafter, the gelating and solvent exchanging 120 will be used together with the silica hydrogel generating 120, and the drying 130 will be used together with the silica aerogel powder generating 130.

In the dispersion-solution generating 110, a dispersion solution is generated by dispersing a water glass solution and an organosilane compound, which are precursors used to synthesize silica aerogel powders, in an organic solvent. In this case, the water glass solution refers to a water glass solution in which ion-exchange does not occur. The organosilane compound refers to hexamethyldisilazane (HMDS). The organic solvent refers to a nonpolar organic solvent. The nonpolar organic solvent may be one selected from the group consisting of an n-hexane solution, an n-heptane solution, toluene and xylene and mixture solutions including at least two of the foregoing.

While the water glass solution is being stirred, the organosilane compound is added. If an organic solution is added while a mixture solution formed by mixing the water glass solution and the organosilane compound is being stirred, a chemical reaction may quickly proceed. A stirring speed may be any speed as long as mixed materials are not separated due to a difference in their specific gravities.

In the gelating and solvent exchanging 120, silica hydrogel is generated by adding the inorganic acid to a dispersion solution and simultaneously performing gelating and solvent-exchanging. The inorganic acid may be nitric acid ($HNO_3$). While the inorganic acid is being added, the dispersion solution is gelated to generate the silica hydrogel. Simultaneously, solvent-exchange proceeds in the silica hydrogel to extract $Na^+$. In the solvent-exchange, water contained in a network structure of the silica hydrogel is substituted by a nucleic acid. In a conventional method, water contained in a network structure of silica hydrogel that is already in a gel state is substituted by a nucleic acid. However, according to an embodiment of the present invention, since water contained in a network structure of silica hydrogel that is in the process of being changed to a gel state is substituted by a nucleic acid, a reaction speed is higher than in the conventional method. In the conventional method, it takes 10 hours to complete the solvent-exchange. However, according to the present embodiment, only a room temperature of 20° C. and about 1 hour are required.

In addition, according to the present embodiment, in order to further reduce the time taken for the solvent-exchange, an atmosphere is changed as follows. The gelating and solvent exchanging 120 may be performed in a temperature atmosphere of 30° C. to 40° C., or stirring is performed at a speed of 10 to 200 revolutions per minute (rpm).

In the drying 130, silica aerogel powders are generated by removing water containing $Na^+$ generated in the gelating and solvent exchanging 120 and then drying the silica hydrogel. A temperature for drying the silica hydrogel is from room temperature to a temperature of 150° C. A pressure for drying the silica hydrogel is one of normal pressure and a reduced pressure atmosphere. In this case, the normal pressure refers to 1 atm, and the reduced pressure atmosphere refers to a pressure less than 1 atm. The reduced pressure atmosphere may be 0.08 to 0.12 atm.

Under the above conditions, the silica hydrogel is dried. In addition, according to an embodiment of the present invention, in order to further reduce a time taken to dry the silica hydrogel, the silica hydrogel is pulverized and the pulverized silica hydrogel is stirred.

The method of preparing a silica aerogel powder according to an embodiment of the present invention differs from a conventional method as follows.

Conventionally, since an inorganic acid and an organosilane compound are directly mixed with each other, a significant amount of heat is generated during a mixing process, which may thus lead to an unstable reaction. However, according to an embodiment of the present invention, an inorganic acid is added to the organosilane compound that is dispersed by the nonpolar organic solvent, there is no significant amount of heat generated during a mixing process, thus leading to a stable reaction, unlike the conventional method.

As described above, in order to complete the solvent-exchange in the silica hydrogel, it takes 10 hours or less in a conventional method, but it takes 1 hour or less according to an embodiment of the present invention.

It is well known to one of ordinary skill in the art that it takes at least 6 hours to perform a method of preparing a silica aerogel powder and that it is difficult to achieve mass production since the method includes complicated processes such as controlling of heat generated in chemical reactions, maturing and washing. However, according to an embodiment of the present invention, since heat generated in chemical reactions is low, maturing and washing are not required, and it takes 2 hours or less to perform all processes, and thus, it is easier to achieve mass production.

Hereinafter, examples of a method according to an embodiment of the present invention will be described.

1. 500 ml of water glass diluent is prepared by diluting water glass so as to form 3 to 10 wt % of $SiO_2$ by using commercially available distilled water.
2. While the water glass diluent is stirred, 50 to 60 ml of HMDS is added.
3. While a stirring speed is maintained, a dispersion solution is generated by adding an organic solvent (normal hexane) to a compound of the water glass diluent and the HMDS.
4. While mixed materials are being stirred in consideration that the mixed materials may not be separated due to a difference in their specific gravities, $HNO_3$ (inorganic acid) is added to the dispersion solution. While the inorganic acid is being added, gelating slowly proceeds in the dispersion solution, and simultaneously solvent-exchange by the organic solvent proceeds in hydrogel.
5. Then, when the solvent-exchange is completed within 1 hour, the stirring is finished and water, in which $Na^+$ extracted from the hydrogel is dissolved, is removed.
6. The hydrogel from which water is removed is dried at normal pressure. In this case, the drying is performed for 30 minutes at a temperature of 100° C., and for 30 minutes at a temperature of 150° C.

Aerogel powder prepared by performing the above processes has a density of 0.05 to 0.10 $g/cm^3$ and superhydrophobicity.

FIG. 2 is a table showing properties of aerogel powders prepared by using a method according to an embodiment of the present invention.

Figure 3:
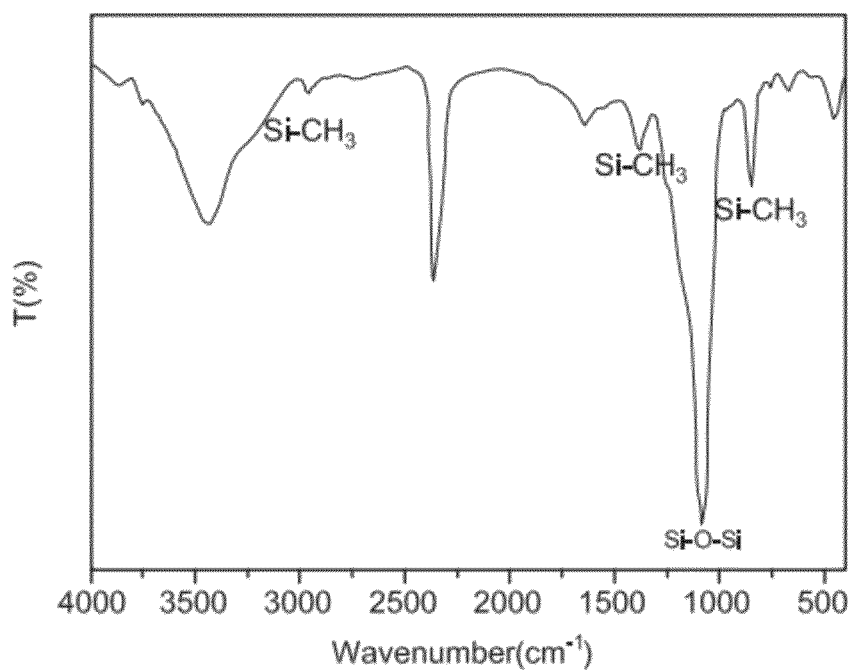
FIG. 3 is a graph of a Fourier transform infrared spectroscopy (FT-IR) analysis result of silica aerogel powders prepared by using a method according to an embodiment of the present invention.

FIG. 3 is a graph of a Fourier transform infrared spectroscopy (FT-IR) analysis result of silica aerogel powders prepared by using a method according to an embodiment of the present invention.

Referring to FIG. 3, since there are three Si—$CH_3$ peaks, the silica aerogel powder prepared by using the method according to the present embodiment is hydrophobic.

Figure 4:
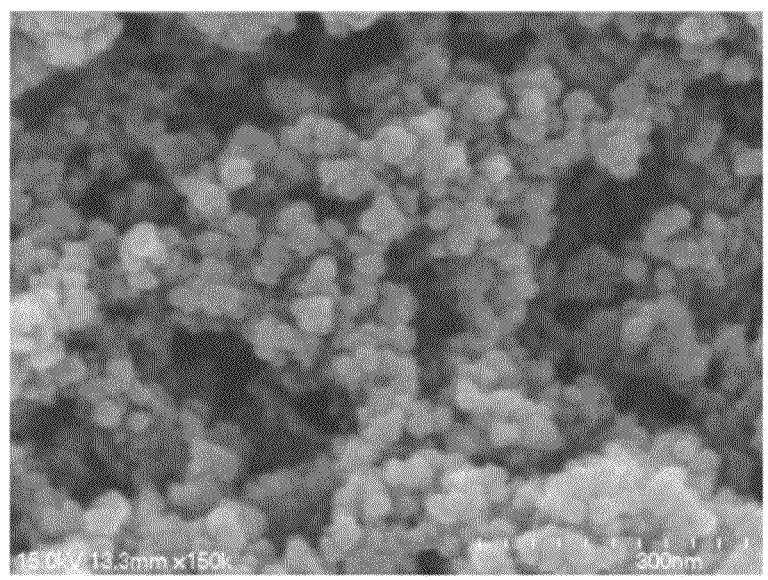
FIG. 4 is an image of a microscopic structure of silica aerogel powders prepared by using a method according to an embodiment of the present invention.

FIG. 4 is an image of a microscopic structure silica aerogel powders prepared by using a method according to an embodiment of the present invention.

The image is captured by using field-emission scanning electron microscopy (FE-SEM). Referring to FIG. 4, there are nano-porous structures in the silica aerogel powders prepared by using the method according to the present embodiment.

As described above, a method of preparing silica aerogel powders according to an embodiment of the present invention has a short preparation time and stable preparation processes.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of preparing silica aerogel powders, the method comprising:
    generating a dispersion solution in which the dispersion solution is generated by dispersing a water glass solution and an organosilane compound in a nonpolar organic solvent,
    wherein the generating the dispersion solution comprises:
        a first stifling the water glass solution in which the organosilane compound is added to the water glass solution; and a second stirring a mixture solution of the water glass solution and the organosilane compound in which the nonpolar organic solvent is added to the mixture solution of the water glass solution and the organosilane compound;

gelating and solvent exchanging a silica hydrogel in which the silica hydrogel is generated by adding an inorganic acid to the dispersion solution and simultaneously performing gelating and solvent-exchanging; and drying a silica aerogel powder in which the silica aerogel powder is generated by drying the silica hydrogel.

2. The method of claim 1, wherein the water glass solution comprises a solution without an ion-exchange.

3. The method of claim 1, wherein the nonpolar organic solvent comprises one selected from the group consisting of an n-hexane solution, an n-heptane solution, toluene and xylene, and mixture solutions comprising at least two of the foregoing.

4. The method of claim 1, wherein the inorganic acid comprises nitric acid (HNO3).

5. The method of claim 1, wherein the organosilane compound comprises hexamethyldisilazane.

6. The method of claim 1, wherein a stifling speed of the first and second stifling steps is a speed that the mixed solution is not separated due to a specific gravity difference of the mixed solution.

7. The method of claim 1, wherein the step of gelating and solvent exchanging is performed for one (1) hour or less in a room temperature atmosphere.

8. The method of claim 1, wherein the step of gelating and solvent exchanging is performed in a temperature atmosphere of 30° C. to 40° C.

9. The method of claim 1, wherein the step of gelating and solvent exchanging further comprises stirring the mixture solution of the water glass solution and the organosilane compound at a speed of 10 rpm to 200 rpm.

10. The method of claim 1, wherein the step of drying further comprises removing water with Na+ generated from the step of the gelating and solvent exchanging.

11. The method of claim 10, wherein the step of drying further comprises at least one of,
pulverizing the silica hydrogel; and
stirring the silica hydrogel.

12. The method of claim 1, wherein the step of drying is performed at from a room temperature to a temperature of 150° C. and at a normal pressure of 1 atm.

13. The method of claim 1, wherein the step of drying is performed at from a room temperature to a temperature of 150° C. and in a reduced pressure atmosphere.

14. The method of claim 13, wherein the reduced pressure atmosphere is a pressure atmosphere of 0.08 to 0.12 atm.

\* \* \* \* \*